US009468187B2

(12) United States Patent
Van Den Berg

(10) Patent No.: US 9,468,187 B2
(45) Date of Patent: Oct. 18, 2016

(54) MILKING DEVICE, METHOD OF MILKING AND SOFTWARE FOR CONTROLLING A MILKING DEVICE

(75) Inventor: Karel Van Den Berg, Bleskensgraaf (NL)

(73) Assignee: LELY PATENT N.V., Maassluis (NL)

( * ) Notice: Subject to any disclaimer, the term of this patent is extended or adjusted under 35 U.S.C. 154(b) by 0 days.

(21) Appl. No.: 13/360,813

(22) Filed: Jan. 30, 2012

(65) Prior Publication Data

US 2012/0145082 A1 Jun. 14, 2012

Related U.S. Application Data

(63) Continuation of application No. PCT/NL2010/000118, filed on Jul. 21, 2010.

(30) Foreign Application Priority Data

Jul. 29, 2009 (NL) ..................................... 1037158

(51) Int. Cl.
*A01J 5/007* (2006.01)
*A01J 5/017* (2006.01)

(52) U.S. Cl.
CPC ................ *A01J 5/007* (2013.01); *A01J 5/017* (2013.01)

(58) Field of Classification Search
CPC ................................ A01J 5/007; A01J 5/017
USPC ......... 119/14.01, 14.02, 14.03, 14.05, 14.07, 119/14.08, 14.14, 14.15, 14.16, 14.17, 119/14.18, 14.38
IPC .................... A01J 3/00, 5/00, 1/00, 5/02, 5/04, A01J 5/14
See application file for complete search history.

(56) References Cited

U.S. PATENT DOCUMENTS 5,718,186 A 2/1998 Van Der Lely
5,762,020 A * 6/1998 van der Lely ............ 119/14.08
5,769,025 A * 6/1998 van der Lely et al. .... 119/14.42
6,073,580 A 6/2000 Grauphner et al.
2003/0106496 A1* 6/2003 Van Der Lingen et al. .......................... 119/14.08
2008/0314322 A1* 12/2008 Stellnert et al. ........... 119/14.02

FOREIGN PATENT DOCUMENTS

DE 19630146 A1 1/1998
EP 628244 * 12/1994
EP 1138192 A1 10/2001

(Continued)

OTHER PUBLICATIONS

Search Report of PCT/NL2010/000118 issued Oct. 25, 2010.

*Primary Examiner* — Thien Thanh Pham
(74) *Attorney, Agent, or Firm* — Hoyng Rokh Monegier LLP; Ramin Amirsehhi; David P. Owen

(57) ABSTRACT

The invention relates to a milking device, a method and software. The milking device includes a device for preventing contaminants in milk during the milking of an animal. The milking device includes a teat cup to be attached to a teat and to be connected to a milk collecting vessel for collecting the milk. The device further includes a detector for generating and transmitting a disruption signal as a result of the detection of a premature becoming detached of the teat cup, and/or as a result of the detection of the incorrect attachment of a teat cup. The device also includes a management system to separate, on the basis of the disruption signal, the milk from the animal into a first amount of milk, which is led to a first destination, and a second amount of milk, which is led to a second destination different from the first destination.

12 Claims, 4 Drawing Sheets

(56) References Cited

FOREIGN PATENT DOCUMENTS

| | | | | |
|---|---|---|---|---|
| GB | 2394291 | A | | 4/2004 |
| NL | 1001646 | C | | 5/1997 |
| WO | 9616536 | A1 | | 6/1996 |
| WO | 20066127921 | A1 | | 11/2006 |
| WO | 2007050012 | A1 | | 5/2007 |
| WO | WO 2008/030085 | | * | 3/2008 |

* cited by examiner

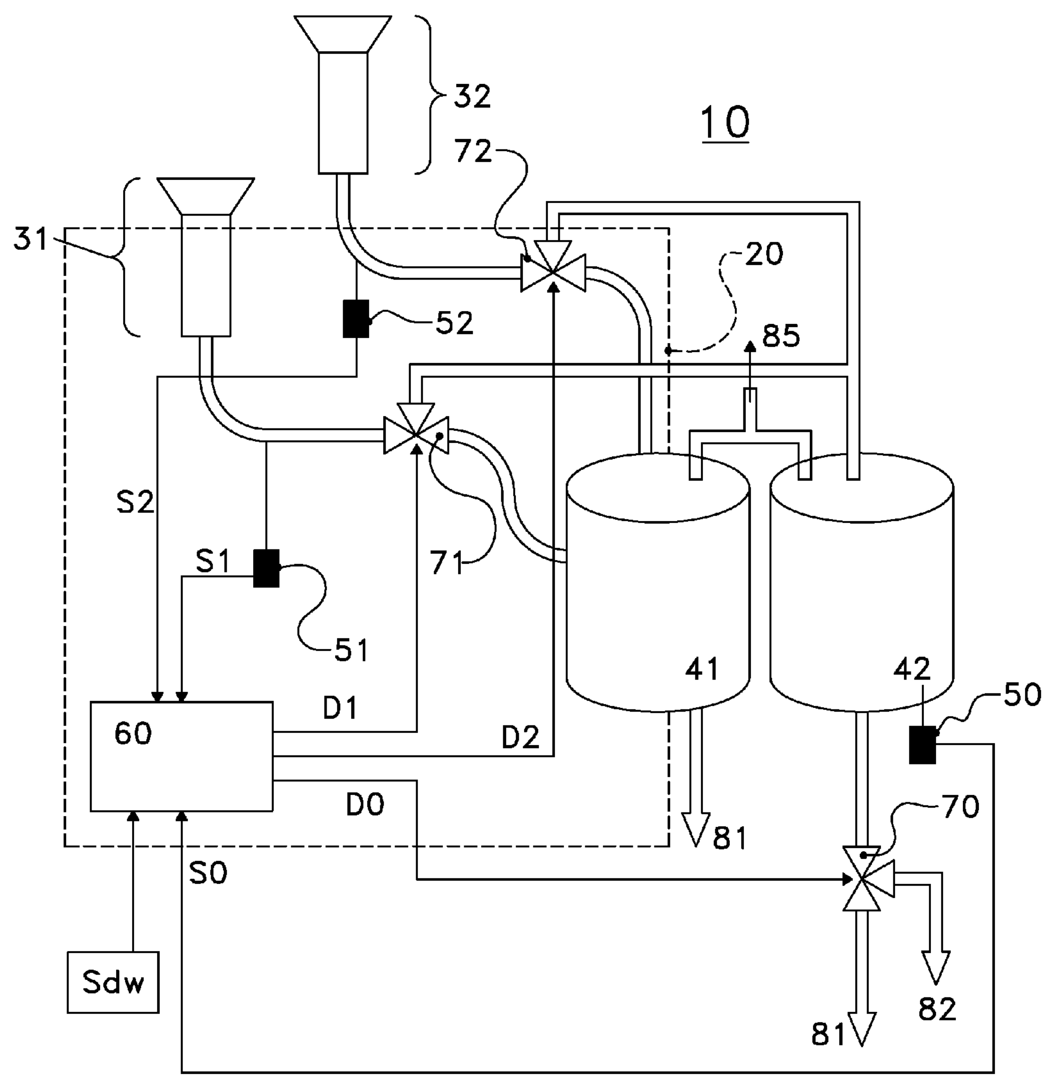
FIG. 1
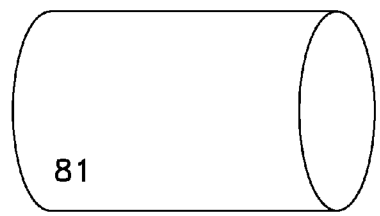

MILKING DEVICE, METHOD OF MILKING AND SOFTWARE FOR CONTROLLING A MILKING DEVICE

CROSS REFERENCE TO RELATED APPLICATIONS

This application is a continuation of PCT application number PCT/NL2010/000118 filed on 21 Jul. 2010, which claims priority from Netherlands application number NL1037158 filed on 29 Jul. 2009. Both applications are hereby incorporated by reference in their entireties.

BACKGROUND OF THE INVENTION

1. Field of the Invention

The invention relates to a milking device which comprises a device for preventing contamination in milk during a milking session for milking an animal. The invention also relates to a method of milking animals and to software for controlling a milking device.

2. Description of the Related Art

Milking devices are known. They are used for optionally fully automatically milking animals, for example cows. Such an automatic milking device comprises a milking robot which comprises a robot arm by means of which four teat cups can each be attached to a teat of the animal. Every teat cup is configured to milk out an udder quarter of the animal.

Contamination of the milk is a frequently occurring problem when milking dairy cattle. Also when milking robots are used, contamination of the milked milk can form a problem, especially when milk is yielded for, for example, cheese production. Different bacteria that can penetrate into the milk as contamination, can also be harmful to human beings. Such harmful bacteria can even survive a production process such as the production of cheese from milk, so that the milk quality is of major importance especially for the production of cheese.

Possible contamination of milk can occur when a teat is not properly clean or when a teat cup comes into contact with the ground or with a leg of the animal. In such a case, dirt can penetrate into the milked milk so that the milk is contaminated.

Dutch patent NL 1001646, which is hereby incorporated by reference, describes a construction with a device for milking animals, comprising one or more milking parlours where an animal can be milked. The device comprises at least one sensor that issues a signal to a computer when a teat cup gets out of operation, for example by being kicked off from a teat.

A disadvantage of the above-described system is that it is not clear whether contamination has taken place and how the milk yielded should be handled. Therefore, contaminants can still be present in the milk.

BRIEF SUMMARY OF THE INVENTION

The invention aims at providing a device for preventing contamination in milk.

The object is achieved by a milking device for preventing contamination in milk during a milking session for milking an animal. The milking device comprises a teat cup which is configured to be attached to a teat of the animal in order to milk the teat and which is connectable to a milk collecting vessel for collecting the milked milk, not being foremilk. The device for preventing contamination comprises detection means, e.g., a detector, for generating and transmitting a disruption signal as a result of the detection of a premature becoming detached of the teat cup during the milking session, and/or as a result of the detection of the incorrect attachment of a teat cup during the milking session. The device further comprises a management system configured to receive the disruption signal and configured to separate, on the basis of the disruption signal, the milk obtained from the animal during the milking session, not being foremilk, into a first amount of milk and a second amount of milk. In this case, the management system is configured to direct the first amount of milk to a first destination, and the second amount of milk to a second destination that is different from the first destination.

Within the scope of this invention, by milking session is meant a continuous period of time within which an animal is milked. The milking session starts as soon as the animal enters the milking device and ends as soon as the animal leaves the milking device.

Usually, the teats are cleaned before a teat cup is attached to the teat and the teat cups have also been cleaned beforehand in order to prevent contamination of the milk. Furthermore, it is usually required to separate foremilk. Foremilk is the first amount of milk from a teat, and can also be contaminated. One of ordinary skill in the art knows to separate foremilk on the basis of optical transparency of milk. All the milk that is yielded after the separation of foremilk is in principle milk that is fit for consumption. From this last, suitable, milk, the first amount of milk, and sometimes, the second amount of milk is selected. Consequently, the foremilk does not form part of the first or second amount of milk.

However, also in that case, during a milking session there are different moments when contamination can penetrate into the milk. Such moments are characterized by the fact that the regular milking process is disrupted while the teat cup has already been connected. This could, for example, occur as a result of the fact that the animal kicks off the connected teat cup during the milking, or as a result of the fact that the teat cup has been attached incorrectly to the teat of the animal, so that the teat cup sucks air. In such situations, a choice should be made about how to handle the possibly contaminated milk. In the milking device according to the invention, the milk from the animal is separated into a first amount of milk, which is certainly not contaminated, and a second amount of milk, which could possibly be contaminated. This separation of the milk from the animal is led to different destinations in order to prevent the possibly contaminated milk from possibly mixing with uncontaminated milk.

In order to be able to detect kicking off or incorrect attachment of the teat cup to the teat, the device comprises detection means, such as sensors. Such sensors could, for example, comprise a pressure sensor that records when the underpressure is interrupted or when the desired underpressure is not achieved and the teat consequently sucks air. Furthermore, the detection means are configured to generate a disruption signal and to transmit same to a management system in order to communicate the disruption of the milking process to the management system. Said management system, also called control device, makes a dichotomy in the collected milk on the basis of the received disruption signal. A first amount of milk is milk that does certainly not contain contaminants that may be caused by a disruption of the milking process that has resulted in the disruption signal; said first amount of milk is led to a first destination, for example a storage tank for storing "good milk". A second amount of milk is milk that possibly contains contaminants that may be caused by a disruption that has resulted in the disruption signal; said second amount of milk is led to a second destination. Said second destination could, for example, be a second collecting vessel or storage tank for feeding purposes, or, if said second amount of milk represents no commercial value, the second destination could comprise the sewer. Owing to the fact that the management system comprises a separation of the milk on the basis of the disruption signal, contaminated milk is prevented from penetrating into the collecting tank and thus contaminating the collecting tank as a result of which the milk already yielded at an earlier point of time would be lost or decrease in commercial value.

In an embodiment of the milking device, the first amount of milk comprises the milk obtained from the animal during the milking session before the management system receives the disruption signal, and the second amount of milk comprises the milk obtained from the animal after the management system has received the disruption signal. Such a clear dichotomy further prevents contaminated milk from penetrating into the collecting vessel. The milking device comprises, for example, a milk collecting vessel that is an temporary storage vessel for the milk of the different teat cups. Such a milk collecting vessel serves as a buffer before the milked milk is conveyed to the storage tank. As soon as the control device receives the disruption signal, the rest of the milk in the milk collecting vessel could possibly also be contaminated—in dependence on how quickly the teat cup that is kicked off or was detected to have been attached incorrectly can be shut off in order to prevent further contamination. If the shutting off of the teat cup in question should not have taken place sufficiently quickly, the contents of the milk collecting vessel could, for example, be added to the second amount of milk. If, however, the shutting off system would be sufficiently quick, so that it was definitely impossible for any contamination to reach the milk collecting vessel, the contents of the milk collecting vessel could be added to the first amount of milk. As a third alternative, the contents of the milk collecting vessel could be checked in order to verify if contamination has possibly taken place. If the check would reveal that no contamination has taken place, the contents of the milk collecting vessel could be added to the first amount of milk.

In an embodiment of the milking device, the milking device comprises a first milk collecting vessel and a second milk collecting vessel, wherein the first milk collecting vessel comprises the first destination and wherein the second milk collecting vessel comprises the second destination. In this embodiment, the milking device now comprises, in addition to the regular milk storage tank, also a second milk collecting vessel for storing the second amount of milk. Also contaminated milk can still be of importance to the farmer. In the first instance, the milk could be examined in the second milk collecting vessel in order to verify if there are indeed contaminants in the milk. In that case, it could still be decided afterwards to simply add the second amount of milk to the first amount of milk if the examination would reveal that no contamination has taken place. But also contaminated milk could still have a commercial value for a farmer—often in dependence on the degree of contamination. Slightly contaminated milk could still be useful for calves. Moreover, milk for human consumption is usually pasteurized or sterilized, so that possible germs of a disease and bacteria that could be present in the contaminated milk, are destroyed.

In an embodiment of the milking device, the detection means are configured to record the quarter in question of the animal, from which quarter the teat cup has become detached prematurely and/or to which the teat cup has been attached incorrectly, and wherein the second amount of milk comprises milk from the quarter in question. The milking device could, for example, comprise a control valve for changing the destination of the milk of every teat cup. There could, for example, be provided two milk collecting vessels, wherein every teat cup comprises a control valve, so that the management system or the control system would be able to decide whether the milk of the teat cup will be collected in the first milk collecting vessel or in the second milk collecting vessel. The second milk collecting vessel could, for example, comprise an intermediate storage for possibly contaminated milk. As soon as a sensor of the milking device records that one of the teat cups has become detached prematurely and which of the teat cups is concerned, the control valve in the teat cup could, for example, assume such a position that the milk of the teat cup in question is not added to the other milk in the first milk collecting vessel, but is stored for further examination in a second milk collecting vessel. As a result thereof, contamination of the yielded milk is prevented further and the milking of the udder quarters of the animal can continue undisturbed—which is beneficial to the well-being of the animal. However, also the quarter where possible contamination has taken place can be milked out, so that the animal will not leave the milking device with a full udder quarter. That would be very unpleasant for the animal and would adversely affect the milk production of the animal in question.

In an embodiment of the milking device, the milking device is configured to change, during the milking session, the destination of the milk of the teat cup from the first destination to the second destination and/or from the second destination to the first destination. For this purpose, the above-mentioned control valve could, for example, be used. Such a control valve could change fairly quickly the destination of the milk, so that contamination of the milk collecting vessel as an intermediate storage for the different teat cups can be prevented. This would also result in the amount of milk that does not contain contaminants remaining maximal, which, of course, means a maximum output for the farmer.

In the present embodiment, the milking device comprises means to change the destination of the milk of a teat cup, both from the first destination to the second destination and from the second destination to the first destination. The latter is of importance, because in the case of an incorrectly attached teat cup which, for example, is connected again by intervention of the farmer or automatically by a robot, the risk of contamination has been reduced or even eliminated after some time. When, for example during a prescribed period of time, the teat has been milked by means of the corrected teat cup, it can be assumed that the possible contaminants have flown away with the milk that has been milked in the meantime. It could then be decided to redirect the destination of the milk from the teat cup in question to the milk collecting vessel in which the milk without contaminants is collected. The decision to redirect the destination to the first destination can also be initiated by additional sensors which are present in the milking device and which monitor the quality of the milk. When these sensors indicate that no contamination is present in the milk from the teat cup in question, the control valve could be actuated and, without being noticed by the animal, the destination of the milk could be reversed again from the second destination to the first destination.

In an embodiment of the milking device, the milking device is configured to reattach the teat cup which, during the milking session, has become detached and/or has been attached incorrectly, to the teat in question during the same milking session in order to complete the milking of the teat in question of the animal. The completion of the milking process of the teat in question of the animal is beneficial to the well-being of the animal and contributes to a continuously high milk production of the animal.

In an embodiment of the milking device, the milking device comprises a plurality of teat cups and the milking device is configured to continue the milking with the teat cup that has been reattached during the milking session only after the milking process in the other teat cups, which have not become detached and have indeed been attached correctly, has been completed. An advantage of the present embodiment is that there is a clear separation between milk that is not contaminated and milk that is possibly contaminated, while the animal is milked completely, which is beneficial to the well-being of the animal and to a continuously high milk production of the animal. This clear separation can be achieved without a second milk collecting vessel being included in the milking device. First, the milking of the teat cups with which no disruption of the milking process was detected is completed. During this completion, the milk of the teat cups is collected in the milk collecting vessel. When the quarters with which no disruption of the milking process was detected have been milked out, the milk of the milk collecting vessel could, for example, be led to the first destination. Subsequently, the teat cup which has been reattached could be activated to milk the second amount of milk by means of the replaced teat cup. This second amount of milk could, for example, be stored in the same milk collecting vessel, whereafter the quality of the second amount of milk could be measured in order to decide whether the second amount of milk is contaminated and what is to be done with it. As an alternative, it could, for example, be decided not to store the second amount of milk in the milk collecting vessel in order to prevent contamination of the milk collecting vessel. The second amount of milk could then be led into an additional milk collecting vessel in order, for example, to be discharged later into the sewer.

In an embodiment of the milking device, the first amount of milk comprises the milk of the teat in question that has been collected before the milking of the reattached teat cup is continued, and wherein the second amount of milk is the milk from the teat in question that has been collected after the milking of the reattached teat cup is continued. As a result thereof, the amount of "good milk" is maximal, because the milk milked earlier from the teat in question is milk of the first amount. This is only possible if the reaction of the milking device on the disruption signal is sufficiently quick, so that the already yielded milk is certainly not contaminated. The milking device could, for example, comprise a closing means for every teat cup, for example on the teat cup or, preferably, in the supply line between the teat cup and the milk collecting vessel. Said closing means could, for example, be actuated by the control device, immediately after recording the disruption signal, to stop the milked milk so that possible contamination cannot enter the milk collecting vessel together with the milked milk. Therefore, the closing means is preferably located in the supply line between the teat cup and the milk collecting vessel, because this additional supply line can serve as a buffer in order to prevent contamination from penetrating into the milk collecting vessel and subsequently contaminating the already yielded milk of the other teat cups.

In an embodiment of the milking device, the milking device is configured to stop the milking process with all teat cups of the milking device after detection of the disruption signal, wherein the first amount of milk comprises milk of the already collected part of the milk from the animal in question, and wherein the device is configured to reattach the teat cup that has become detached and/or has been attached incorrectly, without cleaning this teat cup and/or the associated teat, in order to complete the milking process with the animal in question by collecting the second amount of milk. The disruption of the milking process by, for example, a teat cup being kicked off, can be an indication of an inflammation in one of the quarters of the animal, as a result of which it is unpleasant for the animal to be milked. This means that a cleaning process before the milking process is completed would be unpleasant for the animal. The additional time the animal has to spend in the milking device to undergo the additional cleaning process would not be able to counterbalance the delay in the milking process for the other animals of a herd. The used cleaning means could also lead to contamination of the milk. The reattachment of the teat cup to the teat in question of the animal without cleaning and milking out the teat cup in question, could form a quick, practical and animal-friendly solution to keep the well-being of the animal optimal, to keep the milk production of the animal at the desired level and still to achieve a minimal delay. As already indicated above, slightly contaminated milk could also be useful for the farmer—a clear separation of milk that is certainly not contaminated and milk that is possibly slightly contaminated is of importance. The present milking device makes this possible, so that the quality of the milk is obvious for the farmer.

In an embodiment of the milking device, the milking device is configured, after the teat cup has become detached and/or has been attached incorrectly, to rinse this teat cup with a rinsing fluid according to a preset criterion before the teat cup is replaced to complete the milking. This is especially advantageous if the amount of milk that can still be yielded from the teat in question is considerable. By rinsing the teat cup, and by cleaning the teat in question, the quality of the yielded milk could be guaranteed again, so that the milk that is subsequently yielded from the teat in question can be added again to the first amount of milk.

In an embodiment of the milking device, the milking device is configured, after the teat cup has become detached and/or has been attached incorrectly, to rinse the replaced teat cup according to a preset criterion, wherein the rinsing fluid comprises part of the milk from the animal. As already indicated in the foregoing, cleaning means could also contaminate the milk. When, for example, the teat cup has been attached incorrectly to the teat, the anticipated contamination is minimal. It could be sufficient to rinse with some milk from the animal itself. According to an embodiment of the milking device, this milk, which is used for rinsing, would then be added to the second amount of milk. Subsequently, the milk from the teat in question could be added again to the first amount of milk in the milk collecting vessel. When the teat cup has been kicked off by the animal during the milking process, this embodiment in which rinsing takes place with milk from the animal itself may seem insufficient. The degree of contamination in such a disruption of the milking process seems higher, because the teat cup has been in contact with the leg of the animal and, in the worst case, the teat cup has fallen on the ground. In the case of such a contamination, a thorough cleaning seems necessary.

In an embodiment of the milking device, the rinsing according to the preset criterion comprises exceeding a threshold value of a measured value that is indicative of the quality of the milk, wherein the device comprises a measuring device for measuring the measured value and wherein the milking device is configured to receive the measured value and to compare it with the threshold value. In an embodiment of the milking device, the preset criterion comprises a predetermined amount of rinsing fluid. In an embodiment of the milking device, the preset criterion comprises a predetermined period of time during which rinsing with the rinsing fluid takes place. After the rinsing with this predetermined amount of rinsing fluid or during a predetermined period of time, it is assumed that the teat cup is clean and milk of the first amount can be yielded.

BRIEF DESCRIPTION OF THE DRAWINGS

The features and advantages of the invention will be appreciated upon reference to the following drawings, in which:

These and other aspects of the invention are clarified by and will be explained with reference to embodiments described below.

FIG. 1 shows schematically a first embodiment of the milking device according to the invention.

DESCRIPTION OF ILLUSTRATIVE EMBODIMENTS

Figure 2:
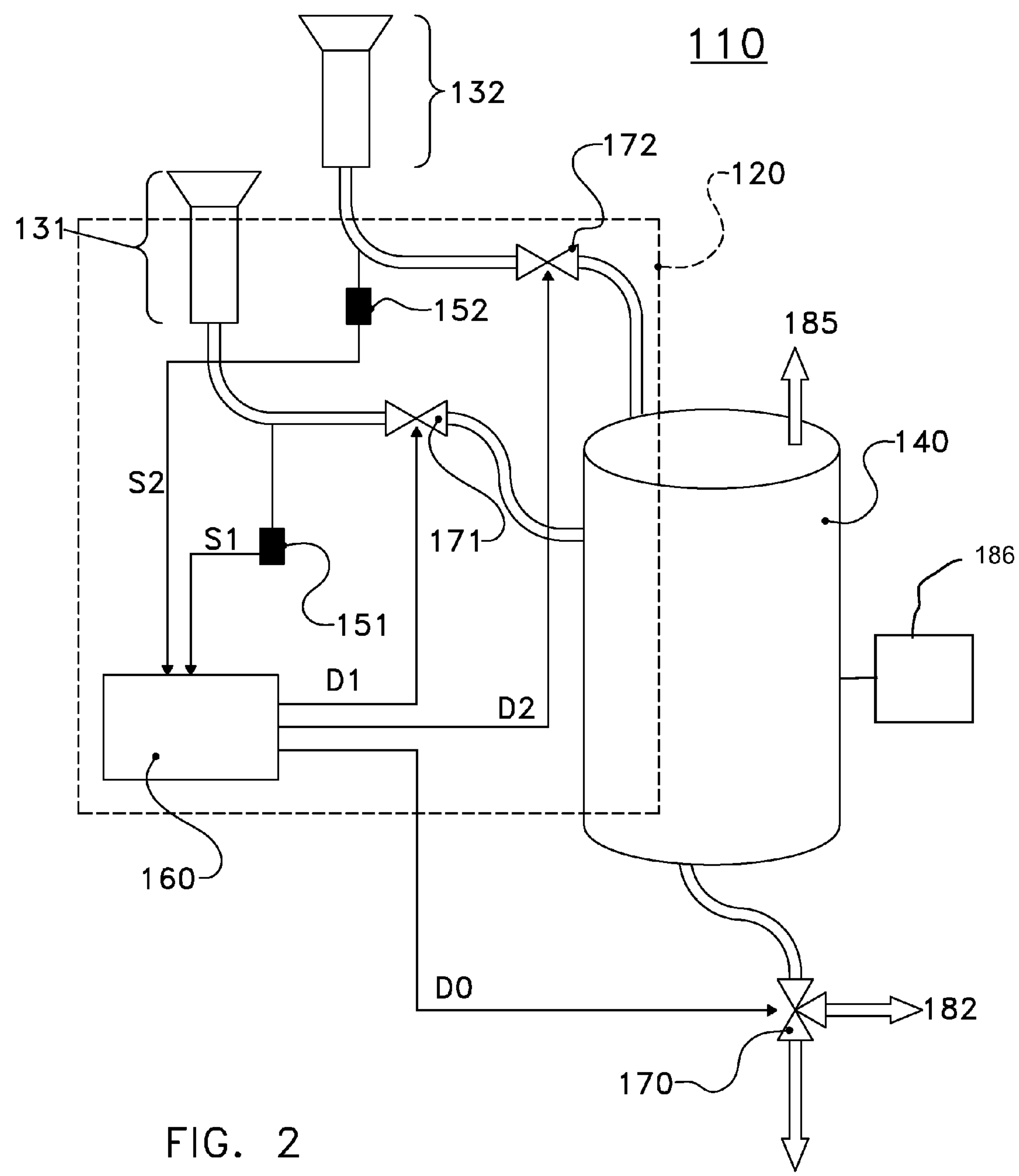
FIG. 2 shows schematically a second embodiment of the milking device according to the invention.

The following is a description of certain embodiments of the invention, given by way of example only and with reference to the drawings. FIG. 1 shows schematically a first embodiment of the milking device 10 according to the invention. The milking device 10 according to the invention comprises a device 20 for preventing contamination in milk during a milking session for milking an animal (not shown). The milking device 10 comprises a number of teat cups 31, 32 which are configured to be attached to a teat (not shown) of the animal in order to milk the teat. Although the schematic illustration of the milking device 10 as shown in FIG. 1 only comprises two teat cups 31, 32, a milking device 10 suitable for cows has four teat cups 31, 32, one teat cup 31, 32 for each teat of the animal. The teat cups 31, 32 are connected to a milk collecting vessel 41, 42, in some applications also called milk glass 41, 42, although the milk collecting vessel 41, 42 need not necessarily be made of glass. In the embodiment as shown in FIG. 1, the milking device 10 comprises two milk collecting vessels 41, 42 which serve as intermediate storage vessels for storing milk of the different teat cups 31, 32. The device 20 comprises detection means 51, 52 for detecting a premature becoming detached of the teat cup 31, 32 during a milking session, and/or for detecting the incorrect attachment of the teat cup 31, 32 during the milking session. Such a detection means 51, 52 could, for example, comprise a pressure sensor 51, 52 which is disposed immediately behind every teat cup 31, 32 in order to see whether the underpressure required for emptying the teat is achieved or disrupted. Both when the teat cup 31, 32 is kicked off and when the teat cup 31, 32 is attached incorrectly, the underpressure measured by the sensor 51, 52 can be lower than the anticipated underpressure, so that such a pressure sensor 51, 52 is useful for both situations, i.e. the kicking off of the teat cup or the incorrect attachment of the teat cups 31, 32. If the anticipated underpressure would not be reached or a disruption of the underpressure would be measured by one of the pressure sensors 51, 52, the pressure sensor 51, 52 in question could generate a disruption signal S1, S2 which is transmitted to a management system 60 or control system 60 for controlling the device 20. Such a management system 60 could, for example, form part of the entire control system (not shown) of the milking device 10, or could comprise a separate control system 60 which is only used to control the device 20 for preventing contamination in milk. The device 20 further comprises the management system 60 which is configured to receive the disruption signal S1, S2 and which is configured to separate, on the basis of the disruption signal S1, S2, the milk obtained from the animal during the milking session into a first amount of milk and a second amount of milk. In this case, the management system 60 is configured to direct the first amount of milk to a first destination 41, 81, and the second amount of milk to a second destination 42, 82 that is different from the first destination 41, 81.

In the schematic illustration of the milking device 10 as shown in FIG. 1, the milking device 10 comprises two milk collecting vessels 41, 42. The milk collecting vessels 41, 42 are connected to vacuum via the connection 85. In most of the known milking devices, the milking device 10 comprises only one milk collecting vessel 41, 42, in which the milked milk is stored before the milk is conveyed to a storage tank 81. In the embodiments of the milking device 10 according to the invention as shown in FIG. 1, the milk is stored during the milking in one of the two milk collecting vessels 41, 42 during the milking session. The second milk collecting vessel 42 is added for the temporary storage of possibly contaminated milk. If the management system 60 would receive a disruption signal S1, S2 indicating that one of the teat cups 31, 32 has been attached incorrectly or has been kicked off by the animal during the milking, in such a situation a contamination of the milk in the first milk collecting vessel 41 could occur. Between each of the teat cups 31, 32 and the milk collecting vessels 41, 42 there is provided a three-way valve 71, 72 which can be actuated individually by actuating signals D1, D2 from the management system 60 or the control system 60. If no disruption of the milking session occurs, the three-way valve 71, 72, which is disposed in the milk transport line between the teat cup 31, 32 and the milk collecting vessel 41, would lead the milk to the first milk collecting vessel 41 where the milk is stored temporarily. At the end of the milking session, that yielded milk would subsequently be conveyed to the storage tank 81. When a disruption signal S1, S2 is received by the management system 60, the conveyance of milk of the teat cup 31, 32 in question can be diverted to the second milk collecting vessel 42, where the possibly contaminated milk is stored. The milking device 10 could, for example, complete the milking session by means of the non-concerned teat cups 31, 32, the milk of which teat cups is still stored in the first milk collecting vessel 41. The non-concerned teat cups 31, 32 are those teat cups 31, 32 which were not detected to have been kicked off during the milking or which were not detected to have been attached incorrectly to the teat. After, for example, the teats connected to the non-concerned teat cups 31, 32 have been milked out, the milking device 10 could still milk out the teat cup 31, 32 in question that, during the milking session, has been kicked off or has been attached incorrectly to the teat. However, in the milking device 10 as shown in FIG. 1, the teat cup 31, 32 in question can be milked out parallel to the non-concerned teat cups 31, 32, because there is provided a separate milk collecting vessel 42 for the storage of possibly contaminated milk of the teat cup 31, 32 in question. Milking out the quarter in question has the advantage of being beneficial to the well-being of the animal. This is also beneficial to the milk yield of the animal in question in the long term. When all quarters of the animal in question have been milked out, the first milk collecting vessel 41 contains milk that is almost certainly not contaminated, while the second milk collecting vessel 42 contains milk that is possibly contaminated because one of the teat cups 31, 32 has been kicked off or has been attached incorrectly to the teat of the animal. In the embodiment of the milking device 10 as shown in FIG. 1, the milking device 10 comprises a sensor 50 for determining the quality of the milk in the second milk collecting vessel 42. On the basis of the analysis of the milk quality by the sensor 50, the management system 60 can decide that no contamination of the milk of the teat cup 31, 32 in question has taken place and the management system 60 can decide to direct the milk from the second milk collecting vessel 42 to the same storage tank 81 where also the non-contaminated milk of the first milk collecting vessel 41 is stored. However, if, on the basis of the analysis of the milk quality by the sensor 50, the milk in the second milk collecting vessel 42 would be contaminated, the milk from the second milk collecting vessel 42 could be led to a second destination 82. Said second destination 82 could, for example, be a second storage tank 82 (not shown) or could, for example, be the sewer 82—in dependence on any economic rest value of the contaminated milk of the second milk collecting vessel 42. In case of doubt, or when the sensor 50 is not present, it can be decided not to add the contents of the second milk collecting vessel 42 to the storage tank 81 in order to be sure that the storage tank 81 contains no contaminants. Doubt can subsist if the quality of, for example, the sensor 50 is not known with certainty. The management system 60 can, for example, control a three-way valve 70 by means of a control single D0 in order thus to decide to direct the contents of the second milk collecting vessel 42 either to the first destination 81 or to the second destination 82.

Usually, the teats are cleaned before a teat cup 31, 32 is attached to the teat, and the teat cups 31, 32 have also been cleaned beforehand, in order to prevent contamination of the milk. However, during a milking session there are still various moments when contaminants can penetrate into the milk. Such moments are characterized by the fact that the regular milking process is disrupted while the teat cup 31, 32 has already been connected to the pulsating underpressure. This could, for example, occur as a result of the fact that the animal kicks off the connected teat cup 31, 32 during the milking, or as a result of the fact that the teat cup 31, 32 has been attached incorrectly to the teat of the animal, so that the teat cup 31, 32 sucks air via the underpressure.

In the above-described situation it is assumed that the pressure sensor 51, 52 transmits the disruption signal S1, S2 sufficiently quickly and that the management system 60 reacts sufficiently quickly to the disruption signal S1, S2, so that the possible contamination cannot yet have entered the first milk collecting vessel 41. Before the possible contamination flows through the three-way valve 71, 72 to the first milk collecting vessel 41, the three-way valve 71, 72 of the teat cup 31, 32 in question will be activated by a control signal D1, D2 from the control system 60 in order to divert the possibly contaminated milk to the second milk collecting vessel 42 in order thus to separate the possibly contaminated milk from the "clean" milk in the first milk collecting vessel 41. If the device 20 for preventing contamination in a milking device 10 would not react sufficiently quickly to a disruption signal S1, S2, the contamination could have reached the first milk collecting vessel 41. In such a case, all non-concerned teat cups 31, 32 could be diverted to the second milk collecting vessel 42, so that the milk in the second milk collecting vessel 42 at any rate does not contain contaminants. The milk of the teat cup 31, 32 in question could then be stored in the first milk collecting vessel 41, whereafter, for example, the first milk collecting vessel 41 comprises a sensor (not shown) to determine the quality of the milk of the first milk collecting vessel 41. If the first milk collecting vessel 41 would indeed contain a possible contamination, the contents of the first milk collecting vessel 41 could be discharged via the sewer. It could be determined beforehand during a characterisation of the device 20 whether the disruption signal S1, S2 is generated sufficiently quickly and whether the control system 60 controls the three-way valve 71, 72 sufficiently quickly to prevent contamination in the first milk collecting vessel 41. Such characterisation depends on the construction of the milking device 10 and depends, for example, on the length of the connection hose between the teat cups 31, 32 and the milk collecting vessel 41. Such characterisation makes it possible to decide whether either the first milk collecting vessel 41 or the second milk collecting vessel 42 is used as a storage vessel for possibly contaminated milk.

In an embodiment of the milking device 10 as shown in FIG. 1, the milking device 10 comprises detection means 51, 52 configured to record the quarter in question of the animal, wherein the teat cup 31, 32 has become detached prematurely and/or to which the teat cup 31, 32 has been attached incorrectly. Owing to the fact that every teat cup 31, 32 comprises its own pressure sensor 51, 52, the control system 60 could look at which pressure sensor 51, 52 has issued the disruption signal S1, S2 and determine, on the basis thereof, which of the quarters of the animal is concerned. The pressure sensor 51, 52 could additionally comprise means to determine what is wrong with the teat cup 31, 32 in question. For example, an abrupt underpressure loss could be an indication that the teat cup 31, 32 in question has been kicked off by the animal. The minimum underpressure in a certain teat cup 31, 32 not being reached could be an indication that the teat cup 31, 32 has been attached incorrectly. For the different cases, an adapted disruption signal could, for example, be transmitted by the sensor 51, 52 to the control system 60 so that, for example, the control system 60 can insert a detailed message in the logbook of the animal in question and/or can send a detailed message to the farmer. As already indicated above, the teat cup 31, 32 frequently being kicked off by the animal can be an indication that with the quarter in question of the animal is something wrong—maybe a light inflammation. By analysing what has exactly gone wrong and recording this in the logbook, it is possible for the farmer to observe a trend over a certain period of time which will enable him to detect possible diseases with an animal in a quicker and easier manner.

The milking device 10 is preferably configured to change, during the milking session, the destination of the milk of the teat cup 31, 32 from the first destination 41, 81 to the second destination 42, 82 and/or from the second destination 42, 82 to the first destination 41, 81. This could improve the speed of the device 20 for preventing contamination and could limit the amount of possibly contaminated milk to a minimum. A quick switching by the milking device 10 could also give the farmer a better guarantee that the yielded milk is indeed free from contaminants.

In the present embodiment, the milking device 10 comprises means 71, 72 to change the destination of the milk of a teat cup 31, 32, both from the first destination 41, 81 to the second destination 42, 82 and from the second destination 42, 82 to the first destination 41, 81. This is of importance, because in the case of an incorrectly attached teat cup 31, 32 which, for example, is replaced correctly by manual intervention of the farmer or automatically by a milking robot, the risk of contamination has been reduced or even eliminated after some time. When, for example during a prescribed period of time, the teat has been milked by means of the corrected teat cup 31, 32, it can be assumed that the possible contaminants have flown away with the milk that has been milked in the meantime. The farmer could then decide to redirect the destination of the milk from the teat cup 31, 32 in question to the milk collecting vessel 41 in which the milk without contaminants is collected. The decision to redirect the destination to the first destination 41, 81 can also be initiated by additional sensors which are present in the milking device 10 and which monitor the quality of the milk. When these sensors indicate that no contamination is present in the milk of the teat cup 31, 32 in question, the control valve 71, 72 could be controlled by the control system 60 and, without being noticed by the animal, the destination of the milk could be reversed again from the second destination 42, 82 to the first destination 41, 81.

In an embodiment of the milking device 10, the milking device 10 is configured to reattach the teat cup 31, 32 which, during the milking session, has become detached and/or has been attached incorrectly, to the teat in question during the same milking session, in order to complete the milking of the teat in question of the animal. The completion of the milking process of the teat in question of the animal is beneficial to the well-being of the animal and contributes to a continuously high milk production of the animal. As the milking device 10 of FIG. 1 comprises two milk collecting vessels 41, 42, the completion of the milking process of the teat in question can be resumed almost immediately, so that not too much time for the animal in question is lost and the animal need not stay unnecessarily long in the milking device 10.

If only one milk collecting vessel 41 would be present (see FIG. 2), then the milking device 10 would continue the milking with the teat cup 31, 32 which has been reattached only after the milking process in the other teat cups 31, 32, which have not become detached and have indeed been attached correctly, has been completed. This enables a clear separation between uncontaminated milk and possibly contaminated milk, while the animal is milked completely and only one milk collecting vessel 41, 42 is required. First, the milking of the teat cups 31, 32 wherein no disruption of the milking process has been detected is completed. During this completion, the milk of the teat cups 31, 32 is collected in the milk collecting vessel 41. When the teats of which the milking has been completed have been milked out, the milk collecting vessel 41 could, for example, be led as an intermediate storage to the first destination 81, for example the storage tank 81. Subsequently, the teat cup 31, 32 which has been reattached could be activated to milk the second amount of milk by means of the replaced teat cup 31, 32. This second amount of milk could, for example, be stored in the meantime in the same milk collecting vessel 41, whereafter the quality of the second amount of milk could be measured in order to decide whether the second amount of milk is contaminated and what is to be done with it. As an alternative, it could, for example, be decided not to store the second amount of milk in the milk collecting vessel 41, but to lead it directly to the sewer, in order to prevent contamination of the milk collecting vessel 41.

The milking device 10 could also be configured to reattach the teat cup 31, 32 that has become detached and/or has been attached incorrectly without cleaning this teat cup 31, 32 and/or the associated teat in order to complete the milking process of the animal in question by collecting the second amount of milk. The disruption of the milking process by, for example, a teat cup 31, 32 being kicked off, can be an indication of an inflammation in one of the teats of the animal, as a result of which it is unpleasant for the animal to be milked. This means that a cleaning process before the milking process is completed would be unpleasant for the animal. The additional time the animal has to spend in the milking device 10 to undergo the additional cleaning process could not counterbalance the delay in the milking process for the other animals of a herd. The used cleaning means could also lead to contamination of the milk. Reattachment of the teat cup 31, 32 to the teat in question of the animal without cleaning, and milking out the teat cup in question, could form a quick, practical and animal-friendly solution to keep the well-being of the animal optimal, to keep the milk production of the animal at the desired level and still to minimize the delay. As already indicated above, slightly contaminated milk could also be useful for the farmer—a clear separation of milk that is certainly not contaminated and milk that is possibly slightly contaminated is of importance. The present milking device 10 makes this possible, so that the farmer is clearly aware of the quality of his milk.

The milking device 10 could also comprise means (not shown) to rinse the teat cup 31, 32, after the teat cup 31, 32 has become detached and/or has been attached incorrectly, with a rinsing fluid according to a preset criterion before the teat cup 31, 32 is replaced to complete the milking. This is especially advantageous if the amount of milk that can still be yielded from the teat in question is considerable. By rinsing the teat cup 31, 32, and by cleaning the teat in question, the quality of the yielded milk could be guaranteed again, so that the milk that is subsequently yielded from the teat in question can be added again to the first amount of milk. The rinsing fluid could possibly comprise part of the milk of the animal. As already indicated in the foregoing, cleaning means could also contaminate the milk. When, for example, the teat cup 31, 32 has been attached incorrectly to the teat, the anticipated contamination is minimal. It could be sufficient to rinse with some milk from the animal itself. This milk with which is rinsed could then, for example, be added to the second amount of milk. Subsequently, the milking could be completed by means of the replaced teat cup 31, 32, in which case the milk from the teat in question could be added again to the first amount of milk in the milk collecting vessel 41. When the teat cup 31, 32 has been kicked off by the animal during the milking process, this embodiment in which rinsing takes place with milk from the animal itself may seem insufficient. The degree of contamination in such a disruption of the milking process seems higher, because the teat cup 31, 32 has been in contact with the leg of the animal and, in the worst case, the teat cup 31, 32 has fallen on the ground. In the case of such a contamination, a thorough cleaning seems necessary.

The milking device 10 according to the invention could comprise a threshold value Sdw, for example, stored in a part of the memory of the management system 60. Said threshold value Sdw could be set by the farmer and could serve as a reference when milk is designated as contaminated or as "clean". The device 20 comprises a measuring device 50 or sensor 50 for measuring the quality of the milk stored in the second milk collecting vessel 42. The measured value S0 measured by the sensor 50 is transmitted to the control system 60 and can be compared there with the stored threshold value Sdw. If the measured value S0, compared with the threshold value Sdw, would indicate that the milk is contaminated, the milk could be led to the second destination. If the measured value S0, compared with the threshold value Sdw, would indicate that the milk is not contaminated, then the milk could still be led to the first destination 81, for example the storage tank 81.

The interim cleaning of the teat cup 31, 32 could also take place by rinsing the teat cup 31, 32 with a predetermined amount of rinsing fluid or by rinsing the teat cup 31, 32 during a predetermined period of time during which cleaning takes place with the rinsing fluid. After the rinsing with this predetermined amount of rinsing fluid or during a predetermined period of time, it is assumed that the teat cup 31, 32 is clean and milk of the first amount can be yielded. The rinsing fluid can comprise water, steam and water with cleaning means. As indicated in the foregoing, the rinsing fluid can also comprise milk from the animal.

FIG. 2 shows schematically a second embodiment of the milking device 110 according to the invention. The most important difference from the first embodiment of the milking device 10 as shown in FIG. 1 is that only one milk collecting vessel 140 is present for temporary storage of the milked milk before the milk is led to the first destination 181, for example the storage tank 181, or before the milk is led to the second destination 182, for example the sewer 182 or a second storage tank 182. The milk collecting vessel 140 is connected to vacuum via the connection 185. The valves 171, 172 which are connected to the teat cups 131, 132 can be simpler, and are especially intended to temporarily stop the milking process in the teat cup 131, 132 which has been kicked off and/or which has been attached incorrectly, in order to prevent contamination from penetrating into the milk collecting vessel 140 and also contaminating the already milked amount of milk. The milking device 110 could, for example, be configured to continue the milking with the teat cup 131, 132 which has been reattached only after the milking process has been completed in the other teat cups 131, 132, which have not become detached and which have indeed be attached correctly. This enables a clear separation between uncontaminated milk and possibly contaminated milk, while the animal is milked completely and only one milk collecting vessel 140 is required. First, the milking of the teat cups 131, 132 wherein no disruption of the milking process has been detected is completed. During this completion, the milk of the teat cups 131, 132 is collected in the milk collecting vessel 140. When the teats of which the milking has been completed have been milked out, the milk from the milk collecting vessel 140 could, for example, be led as an intermediate storage to the first destination 181, for example the storage tank 181. Subsequently, the teat cup 131, 132 which has been reattached could be activated to milk the second amount of milk by means of the replaced teat cup 131, 132. This second amount of milk could, for example, be stored in the meantime in the same milk collecting vessel 140, whereafter the quality of the second amount of milk could be measured in order to decide whether the second amount of milk is contaminated and what is to be done with it.

The milking device 110 as shown in FIG. 2 could comprise a sensor 186 which checks the quality of the milk in the milk collecting vessel 140 and which helps to decide whether the milk is led to the first destination 181 or to the second destination 182. This could, for example, be controlled by the management system 160 or the control system 160 which is able to send a control signal D0 to a three-way valve 170, so that it can be decided to which destination the milk of the milk collecting vessel 140 is led.

Figure 3:
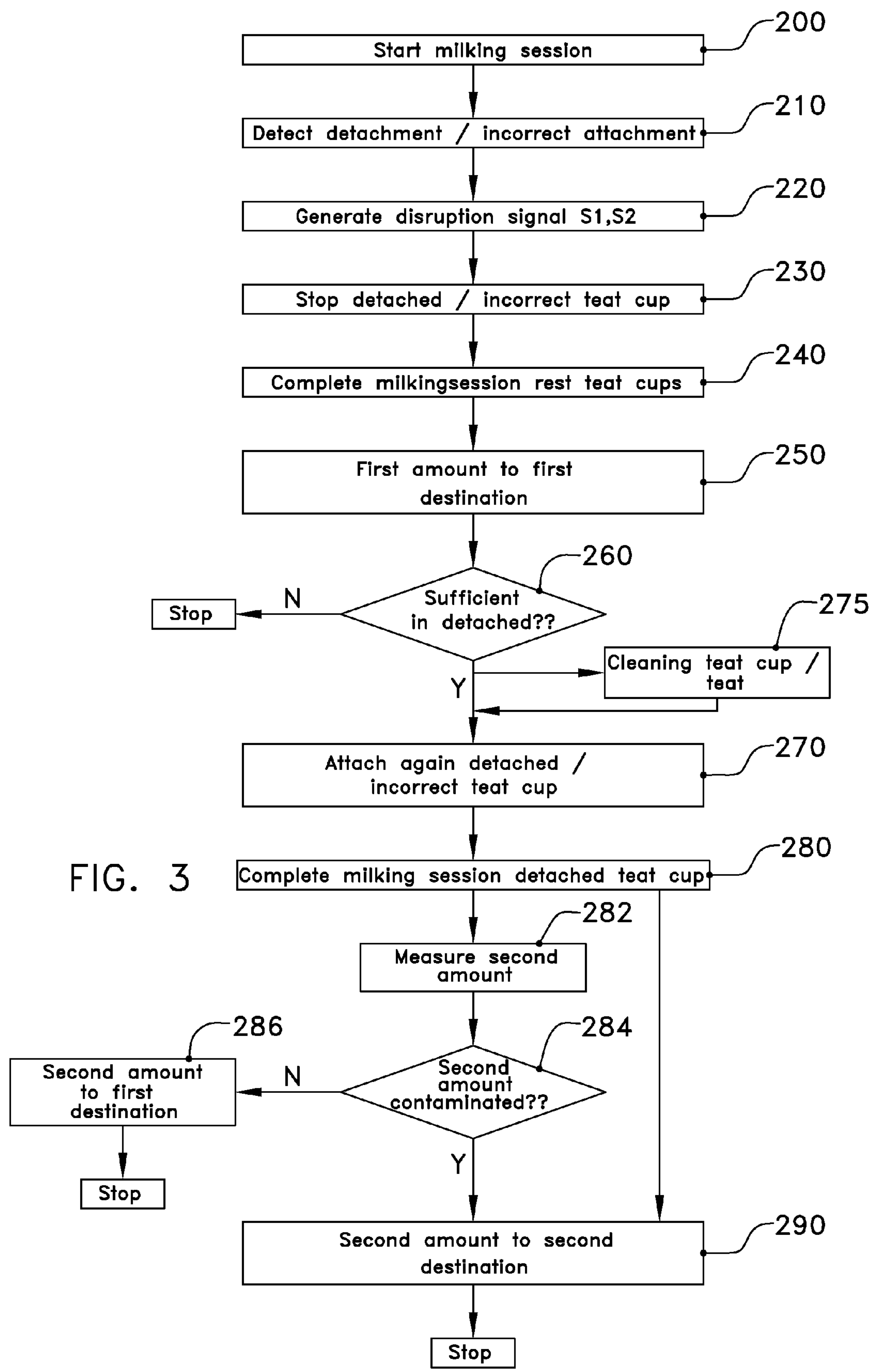
FIG. 3 shows in a flowchart the steps of the method according to the invention.

FIG. 3 shows in a flowchart the steps of the method according to the invention. These steps as indicated in the flowchart could be coded as a software program in order to make the milking device 10, 110 carry out the steps in the flowchart.

The step "start milking session" 200 comprises all steps that are required to start a milking session with an animal. If the milking device 10, 110 comprises a box (not shown) from which a milking robot (not shown) can automatically connect the teat cups 31, 32; 131, 132 to milk the animal, the animal will be led into the box by means of concentrate, whereafter the milking robot 10, 110 cleans the teats of the animal and connects the teat cups 31, 32; 131, 132. Subsequently, the regular milking process will start. If no disruption of the milking process takes place, every teat cup 31, 32; 131, 132 will milk out the associated quarters, whereafter the teat cups 31, 32; 131, 132 will be disconnected and the animal will leave the milking device 10, 110. However, when a disruption of the regular milking process takes place, for example one of the teat cups 31, 32; 131, 132 is kicked off by the animal during the milking or is attached incorrectly to the teat of the animal by the milking robot, it is necessary to be able to guarantee a clear separation between milk that possibly contains contaminants and milk that certainly contains no contaminants.

In the step "detect detachment/incorrect attachment", the sensor 51, 52; 151, 152 records that one of the teat cups 31, 32; 131, 132 has become detached and/or has been attached incorrectly.

Subsequently, the sensor 51, 52; 151, 152 generates the disruption signal S1, S2 in the step "generate disruption signal S1, S2" 220, which disruption signal is transmitted to the management system 60, 160 or the control system 60, 160. Preferably, it is clear to the control system 60, 160 with which quarter of the animal a disruption of the regular milking process has taken place. The control system 60, 160 will then stop the milking process in the teat cup 31, 32; 131, 132 in question in the step "stop detached/incorrect teat cup" 230 and will complete the milking process in the other teat cups 31, 32; 131, 132 in the step "complete milking session rest teat cups" 240. When the milking process with the teat cups 31, 32; 131, 132 which have not been kicked off and which have been attached correctly to the teat has been completed, the first amount of milk will be led to the first destination 41, 81, 181 in the step "first amount to first destination" 250. Subsequently, it is looked at whether there is still sufficient milk in the quarter of which the milking process has been stopped in the step "sufficient in detached??" 260. For, when there is still hardly any milk present in the quarter in question, it is perhaps not necessary to reattach the teat cup 31, 32; 131, 232 in question, while reattachment would take much time and would cause frustration with the animal in question. If insufficient remaining milk would be present in the quarter in question, indicated in the flowchart by the letter "N", the process is stopped. If, on the other hand, sufficient milk would be present in the quarter in question, indicated in the flowchart by the letter "Y", the process is continued in the step "attach again detached/incorrect teat cup" 270. Optionally, the step "cleaning teat cup/teat" 275 could be carried out, depending on the preference of the farmer in question. Subsequently, the milking session for the again attached teat cup 31, 32; 131, 132 is completed in the step "complete milking session detached teat cup" 280. The milk yielded during this step could possibly be contaminated and could, in the step "second amount to second destination" 290, be led to the second destination 42, 82, 182. As an alternative, a step "measure second amount" 282 could be carried out wherein the milk of the second amount is checked on the presence of contaminants. The step "second amount contaminated??" 284 could, for example, compare a value measured on the second amount with a threshold value Sdw (see FIG. 1). If a contamination is detected, which is indicated in the flowchart by the letter "Y", the milk could indeed be led to the second destination 42, 82, 182. However, if no contamination would be detected, which is indicated in the flowchart by the letter "N", the milk could still be added to the first amount 81, 181 in the step "second amount to first destination" 286. Subsequently, the milking session is ended.

Figure 4:
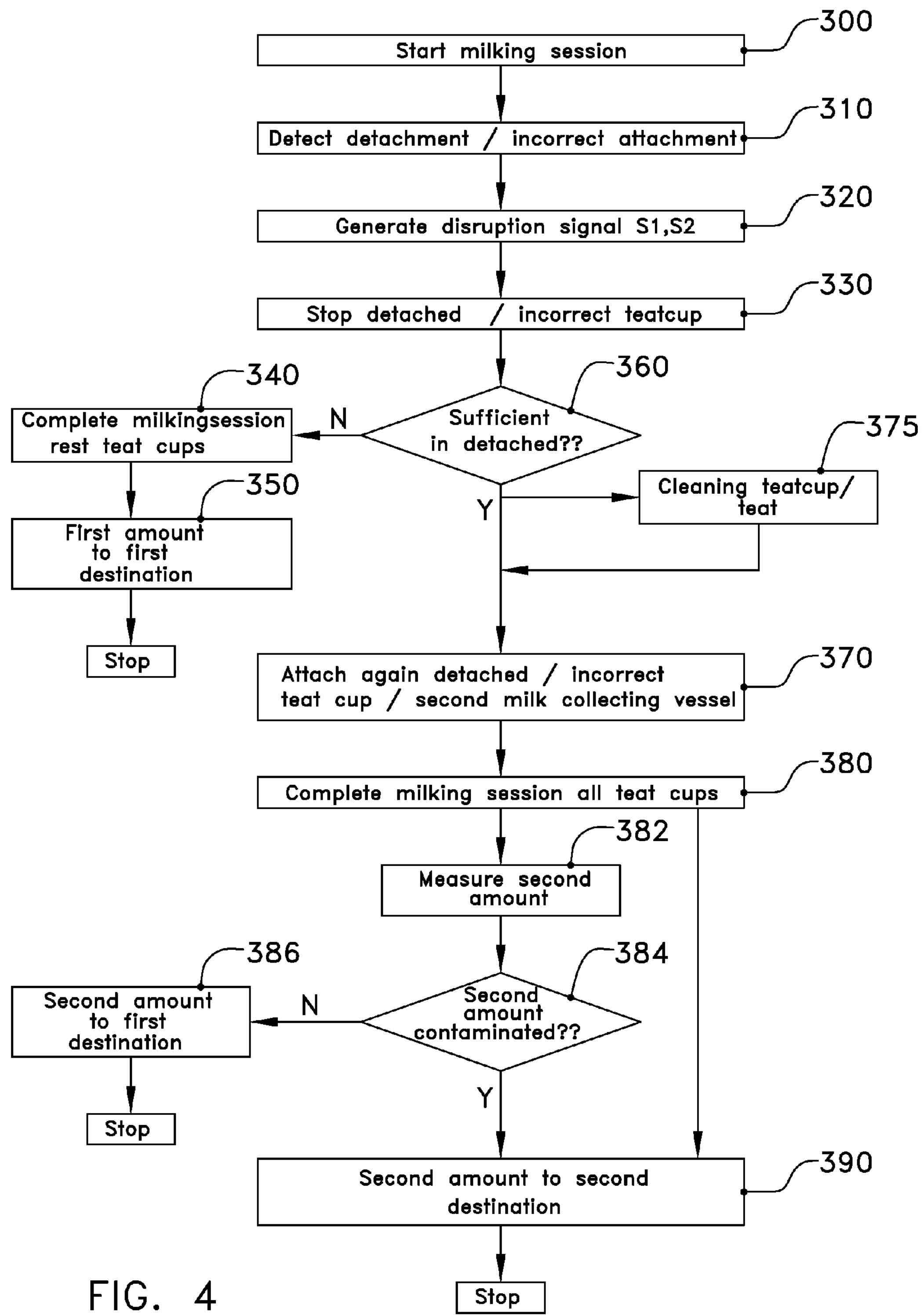
FIG. 4 shows in a flowchart alternative steps of the method according to the invention.

If the milking device 10 would comprise a second milk collecting vessel 42, as shown in FIG. 1, the flowchart could be somewhat different. For, in that case it is not necessary to wait with the completion of the milking process of the incorrect teat cup 31, 32; 131, 132 until the milking session of the other teat cups 31, 32; 131, 132 has been completed. Such a flowchart is shown in FIG. 4.

The steps "start milking session" 300, "detect detachment/incorrect attachment" 310, "generate disruption signal S1, S2" 320 and "stop detached/incorrect teat cup" 330 are analogous to the earlier steps 200 to 230 of FIG. 3. Subsequently, in this adapted flowchart it is looked at whether there is still sufficient milk in the detached/incorrect teat cup 31, 32; 131, 132 in the step "sufficient in detached??" 360 in order to examine whether it is profitable to reattach the teat cup 31, 32; 131, 132 in question. If not sufficient milk seems to be present in the teat in question, indicated in the flowchart by the letter "N", the milking session in the remaining teat cups 31, 32; 131, 132 is completed in the step "completion milking session rest teat cups" 340 and the "first amount" is subsequently led "to the first destination" 350, whereafter the milking session is stopped.

If sufficient milk seems indeed to be present in the teat in question, indicated in the flowchart by the letter "Y", the teat cup 31, 32; 131, 132 in question is reattached to the teat and this milk is conveyed to the second milk collecting vessel 42 (see FIG. 1) in the step "attach again detached/incorrect teat cup/second milk collecting vessel" 370. Subsequently, the milking session of all attached teat cups 31, 32; 131, 132 is completed in the step "complete milking session all teat cups" 380. The milk in the first milk collecting vessel 41 is milk of the first amount, which is not contaminated and which is subsequently led to the first destination. The milk in the second milk collecting vessel 42 is measured in the step "measure second amount" 382. The step "second amount contaminated??" 284 could, for example, compare a value measured on the second amount with a threshold value Sdw (see FIG. 1). If a contamination is detected, which is indicated in the flowchart by the letter "Y", the milk could indeed be led to the second destination 42, 82, 182 in the step "second amount to second destination" 390. However, if no contamination would be detected, which is indicated in the flowchart by the letter "N", the milk could still be added to the first amount 81, 181 in the step "second amount to first destination" 386. Subsequently, the milking session is ended. If no sensor 50 (see FIG. 1) would be present or the quality of the sensor 50 would be insufficient to be able to guarantee if there are contaminants in the second amount of milk, after the completion of the milking session in all teat cups 31, 32; 131, 132 of step 380, the milk of the second amount could be led directly to the second destination 82, 182 in step 390.

The milking device 10, 110 according to the invention is not limited to milking devices 10, 110 which comprise a milking robot, but can also be used in a milking device 10, 110 wherein the teat cups 31, 32; 131, 132 are attached manually to the teat of an animal. The milking device 10, 110 according to the invention can also be applied to a plurality of milking boxes which are operated by one milking robot, also known as milking carrousel.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. An automatic milking device comprising a device for preventing contamination in milk during a milking session for milking an animal, wherein the milking device comprises a plurality of teat cups configured for attachment to a plurality of teats of the animal to milk the plurality of teats and wherein each teat cup comprises a control valve for connection to a milk collecting vessel for collecting the milk, not being foremilk, wherein the device for preventing contamination comprises:

a detector for generating and transmitting a disruption signal as a result of at least one of:

detection of premature detachment of a teat cup of the plurality of teat cups during the milking session, and detection of incorrect attachment of a teat cup of the plurality of teat cups during the milking session; and a management system configured to receive the disruption signal, and configured to separate, on the basis of the disruption signal, the milk obtained from the animal during the milking session, not being foremilk, into a first amount of milk and a second amount of milk, wherein the management system is configured to direct the first amount of milk to a first destination, and the second amount of milk to a second destination that is different from the first destination;

and wherein the management system is further configured to decide whether the milk of a teat cup will be collected in the first destination or in the second destination;

wherein the milking device is configured to reattach the teat cup that during the milking session, has become at least one of detached and attached incorrectly, to the teat during the same milking session, in order to complete the milking of the teat of the animal, and wherein the milking device further comprises a computer programmed with instructions and is thereby configured to continue the milking with the teat cup that has been reattached during the milking session only after the milking process in the other teat cups, that have not become detached and have been attached correctly, has been completed.

2. The milking device according to claim 1, wherein the first amount of milk comprises the milk obtained from the animal during the milking session before the management system receives the disruption signal, and wherein the second amount of milk comprises the milk obtained from the animal via a teat cup associated with a disruption signal after the management system has received the disruption signal.

3. The milking device according to claim 1, wherein the milking device comprises a first milk collecting vessel and a second milk collecting vessel, wherein the first milk collecting vessel comprises the first destination and wherein the second milk collecting vessel comprises the second destination.

4. The milking device according to claim 1, wherein the milking device is configured to change, during the milking session, at least one of: the destination of the milk of the teat cup from the first destination to the second destination, and from the second destination to the first destination.

5. The milking device according to claim 1, wherein the first amount of milk comprises the milk of the teat from which the teat cup that was at least one of detached and attached incorrectly has been collected before the milking of the reattached teat cup is continued, and wherein the second amount of milk is the milk from the teat that has been collected after the milking of the reattached teat cup is continued.

6. The milking device according to claim 1, wherein the milking device is configured to stop the milking process with all teat cups of the milking device after detection of the disruption signal, wherein the first amount of milk comprises milk of the already collected part of the milk from the animal, and wherein the device is configured to reattach the teat cup that at least one of: has become detached and has been attached incorrectly, without cleaning at least one of the teat cup and the associated teat, in order to complete the milking process with the animal by collecting the second amount of milk.

7. The milking device according to claim 1, wherein the milking device is configured, after at least one of premature attachment and incorrect attachment, to rinse this teat cup with a rinsing fluid according to a preset criterion, before the teat cup is replaced to complete the milking.

8. The milking device according to claim 7, wherein the rinsing fluid comprises part of the milk from the animal.

9. The milking device according to claim 1, wherein the milking device is configured, after the teat cup detachment or incorrect attachment, to rinse the replaced teat cup according to a preset criterion, wherein the rinsing fluid comprises part of the milk from the animal.

10. The milking device according to claim 9, wherein the milking device is configured to add the milk that is used for the rinsing of the replaced teat cup to the second amount of milk, and to add the milk that is milked after the rinsing to the first amount of milk.

11. The milking device according to claim 9, wherein the preset criterion comprises at least one of:

exceeding a threshold value of a measured value that is indicative of the quality of the milk, wherein the device comprises a measuring device for measuring the measured value and wherein the milking device is configured to receive the measured value and to compare it with a least one of the threshold value, a predetermined amount of rinsing fluid, and a predetermined period of time during which rinsing with the rinsing fluid takes place.

12. The milking device according to claim 1, wherein the teat cup is configured to be reattached without first cleaning at least one of the teat cup and the associated teat.

* * * * *